Dec. 29, 1931. S. MENDEL 1,838,185
AUTOMATIC SAFETY APPARATUS FOR GAS LIGHTING AND GAS HEATING APPLIANCES
Filed May 10, 1929 3 Sheets-Sheet 1
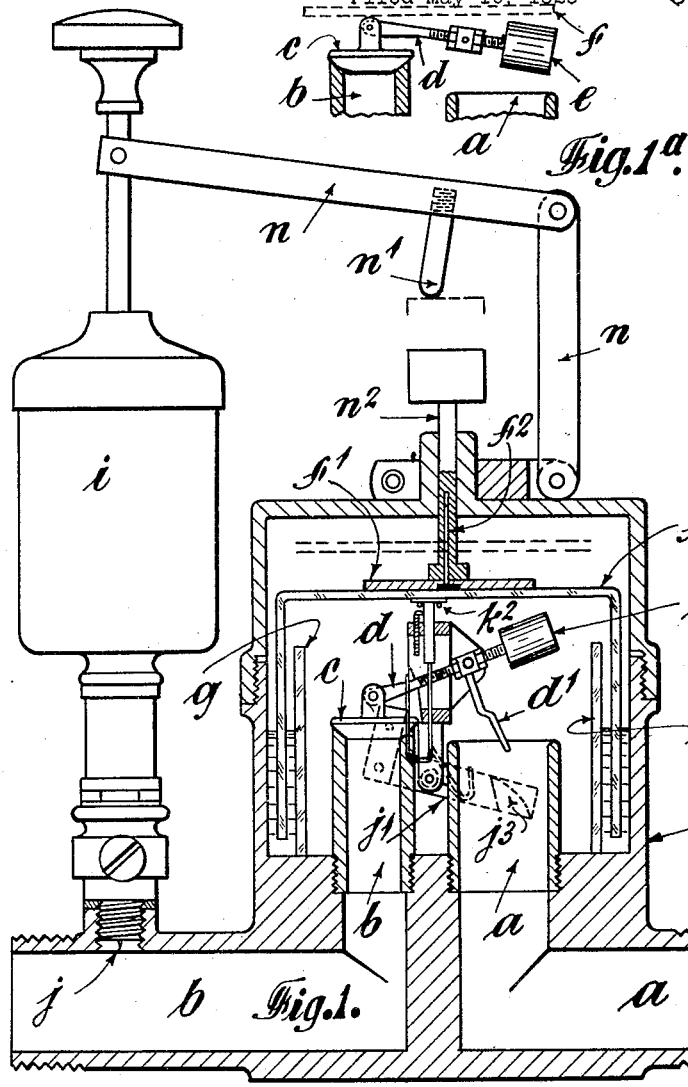
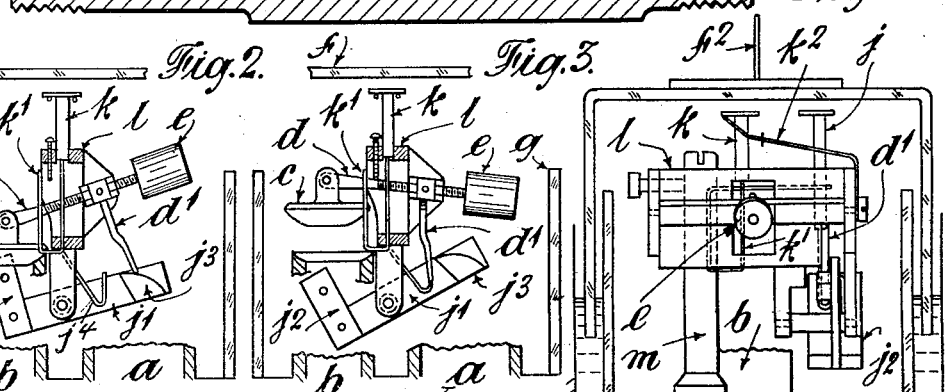
INVENTOR:
SAM MENDEL, DEC'D, by Harry Aaronson,
EXECUTOR:
Walter Gunn.
By his Attorney:

INVENTOR:
SAM MENDEL, DEC'D,
by Harry Aaronson,
EXECUTOR.
By his Attorney - Walter Gunn Dec. 29, 1931. S. MENDEL 1,838,185
AUTOMATIC SAFETY APPARATUS FOR GAS LIGHTING AND GAS HEATING APPLIANCES
Filed May 10, 1929 3 Sheets-Sheet 3

INVENTOR:
SAM MENDEL, DEC'D.,
By Harry Aaronson EXECUTOR.
By his Attorney:- Walter Gunn Patented Dec. 29, 1931

1,838,185

UNITED STATES PATENT OFFICE

SAM MENDEL, DECEASED, LATE OF CHORLTON-ON-MEDLOCK, MANCHESTER, ENGLAND, BY HARRY AARONSON, OF MANCHESTER, ENGLAND, EXECUTOR

AUTOMATIC SAFETY APPARATUS FOR GAS-LIGHTING AND GAS-HEATING APPLIANCES

Application filed May 10, 1929, Serial No. 362,036, and in Great Britain May 23, 1928.

This invention refers to the automatic control of the flow of a gas through a pipe or conduit, as, for example, in the supply of gas to gas-lighting and gas-heating appliances, and a particular use of the invention is in the automatic control of gas passing from a coin-controlled meter to gas-lighting and gas-heating appliances. With such type of meter and with such appliances it frequently happens that the supply of gas fails while the appliances are in use, and unless a coin is inserted before the light is extinguished, or unless the burner taps are all closed as soon as the light goes out, the new supply of gas, obtained by the insertion of a fresh coin in the meter, escapes into the room in which the appliances are situated, with resultant waste of gas, and/or with unpleasant results to the occupants of the room. Similar results are liable to arise with ordinary meters as well as coin-controlled meters say in the event of the main supply of gas being cut off prior to repairing a gas main and without warning to the users to close the taps.

To overcome said drawbacks it has been proposed to provide automatic control apparatus between the meter or other source of supply and the final outlet or outlets, whereby on the failure of the gas supply a valve automatically closes the passage for the gas and remains closed until re-opened by hand, or automatically.

The present invention refers to a new or improved construction and arrangement of automatic gas controlling apparatus of the kind in which the valve is re-opened automatically.

According to the invention, the improved apparatus comprises a chamber in the line of the gas supply with inlet and outlet ports, a valve for controlling the outlet port normally held open by a balance weight, means on the inlet side of the valve to automatically close the valve when the gas supply fails and hold it closed until the gas supply is renewed, said means being moved clear of the valve on the renewal of the gas supply and the valve being then held to its seating by the pressure of the gas on its top face, and means for producing on the outlet side of the valve, after the renewal of the gas supply and after closing the final outlet or outlets, a pressure equal to that on the inlet side to allow the valve to re-open under the influence of its balance weight.

The improved apparatus also preferably comprises means for locking the valve against accidental disturbance both in the open and closed positions, or in the closed position only, examples of such valve-locking means being hereinafter fully described.

Upon the accompanying drawings:—

Fig. 1 illustrates a sectional elevation of one example of the improved gas-controlling apparatus, the parts being shown in the valve-closed position.

Fig. 1a illustrates the main parts of Fig. 1, in their simplest form.

Figs. 2 and 3 are repeat sectional views of parts of Fig. 1, but one showing the valve closed and the other showing it open.

Fig. 4 illustrates a further sectional view, but taken at right angles to the plane of Figs. 1, 2, and 3.

Figure 5:
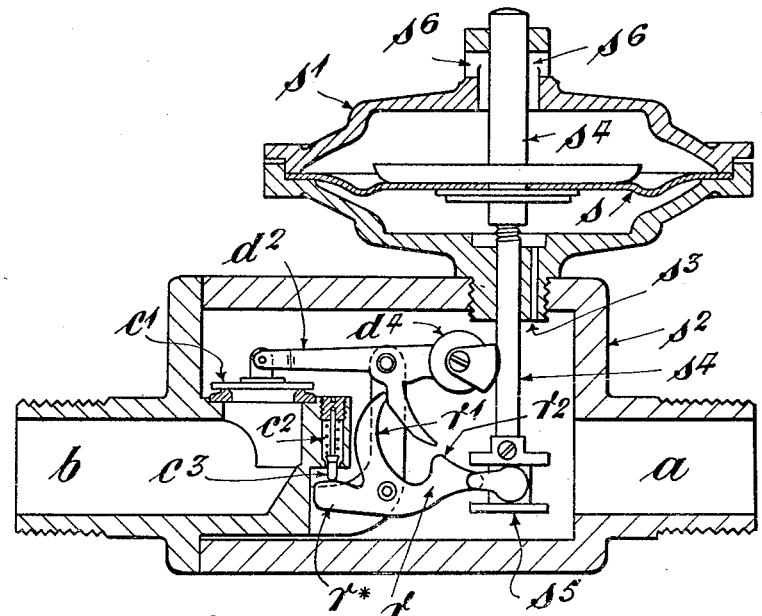
Fig. 5 illustrates a longitudinal section of another example of the improved gas-controlling apparatus.
Figure 6:
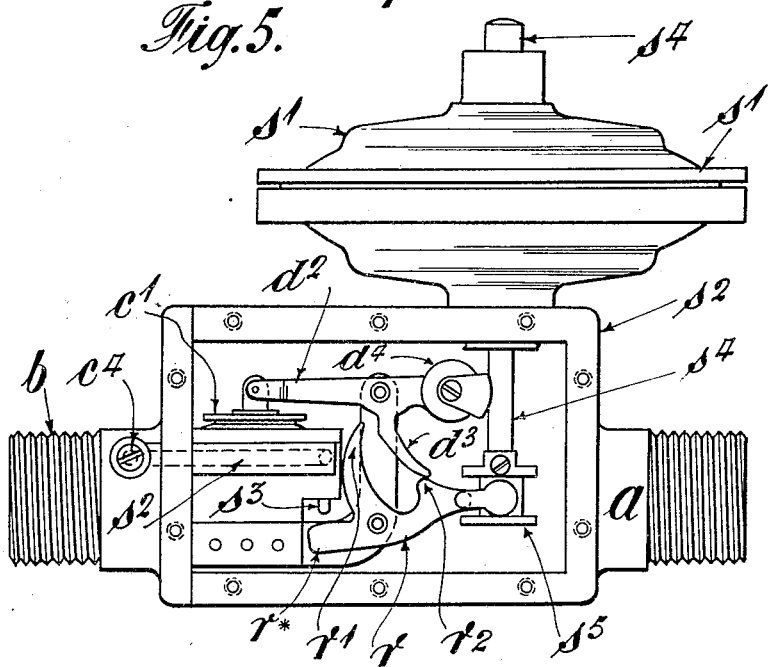
Figs. 6 and 7 illustrate side views of the same apparatus, but with certain parts shown in different relative positions.
Figure 7:
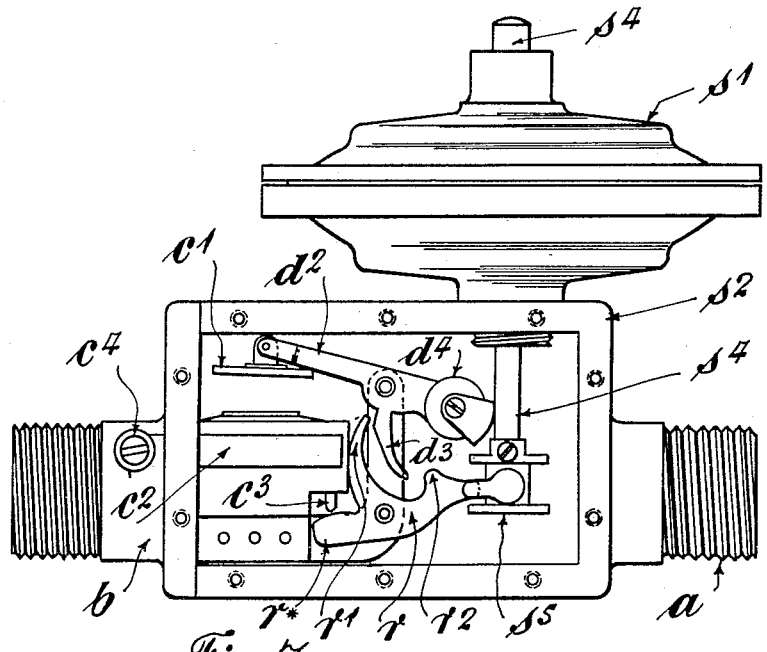
Figure 8:
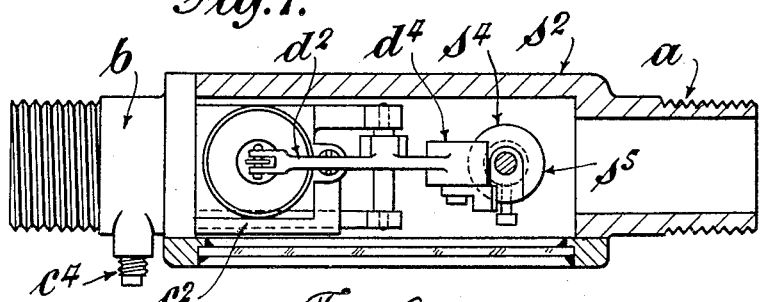
Figs. 8 and 9 are sectional plans respectively of the same apparatus taken on slightly different planes.
Figure 9:
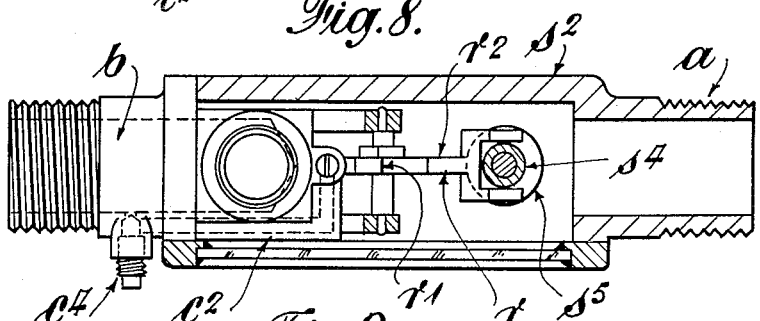

Referring to Figs. 1 to 4, $a$ is the gas inlet passage of the apparatus, and $b$ the gas outlet passage, the base part of the apparatus having pipe-like extremities for connection with the usual gas supply piping leading from the meter, and leading to the burners of the gas-lighting or gas-heating appliances. $c$ is the valve adapted to close or open the passage $b$, being pivotally suspended from one end of the lever $d$ and its weight being slightly over-balanced by an adjustable weight member $e$ at the other end of the lever. $f$ is the "bell" preferably made of glass, and at its lower edge adapted to dip into a bath of mercury between the inner fixed cylinder $g$ (also preferably made of glass) and the outer closed metal casing $h$, and thereby form a gas seal, between itself and the casing.

With the full supply of gas entering the bell $f$ through the passage $a$, the bell is raised, say to the height shown by the dotted lines. Owing to the balance weight $e$, the valve $c$, is normally held raised (open), thereby allowing the gas, when turned on, to enter and pass through the outlet passage $b$ to the burner or burners. Immediately the gas supply fails, the bell $f$ drops, and pressing upon the valve $c$, forces it down on to its seating in the top of the passage $b$, thereby closing such passage. This is more clearly seen in Fig. 1a.

With the renewal of the gas supply, the bell is again raised and held raised, but owing to the pressure of the gas upon its top surface, the valve $c$ remains closed, the weight $e$ not being sufficient to overcome the weight of the valve plus the pressure of the gas.

$i$ is an air pump by which air is forced into the passage $b$ when requiring the valve to open, said pump comprising a piston (or diaphragm) within a cylinder, a piston rod and a regulatable needle valve $j$. By sharply depressing the piston rod of the pump, a small jet of air is forced into the passage $b$, and, provided the final outlet or outlets is or are closed, the valve $c$ is placed in equilibrium, and thereby made free to open under the influence of the balance weight and resume its normal, raised position. If the final outlets or any one of them remains open, the air jet has no effect on the valve, in other words, until the pressure of the gas above the valve is balanced by a like pressure below it, the valve will not open, hence the necessity for first closing the final outlet or outlets.

For the purpose of locking the valve $c$ in both the fully open and fully closed positions against accidental disturbance, a pair of plungers, $j$, $k$, is provided, slidably mounted in a cross-bar or frame $l$, carried by a pillar $m$, from the floor of the chamber, see Fig. 4, one part of the frame lying immediately above the valve lever. The plunger $j$ at its lower end, engages a further weighted lever $j^1$, which at the end furthest from the weight $j^2$ is fitted with a small block $j^3$ with one face flat and the adjacent face rounded or bevelled, see Fig. 2.

Depending from the valve lever $d$ is an arm $d^1$ which reaches down to the further lever $j^1$ and is positioned and shaped so that, in one position of the valve (closed), the lower free end of the arm lies against the curved or bevelled face of block $j^3$, see Fig. 2, and thereby holds the valve in the closed position, while in another position of the valve (open), the lower free end of the arm lies against, or in front of the edge of the block $j^3$, see Fig. 3, and thereby holds the valve in the open position.

Extending downwards from the plunger $k$ is a wire-like extension $k^1$, which after extending downwards and through the lower part of the frame $l$, extends laterally, then upwards, and then over the valve lever $d$ when the valve is fully raised, see Fig. 3. Both plungers are comparatively light and offer little resistance to downward pressure, while one of them (plunger $k$) is held normally raised by a light spring $k^2$. The plunger $j$ also has a wire extension $j^4$, which at its lower end hooks over the upper edge of the lever $j^1$, see Fig. 2, and with the depression of the plunger, rocks the lever $j^1$ against the resistance of its balance weight.

With the apparatus in use, the failure of the gas causes the bell $f$ to fall and press upon both plungers $j$, $k$, whereby one holds the valve $c$ to its seating, while the other causes the valve lever $j^1$ to move from the position shown in Fig. 3 to the position shown in Fig. 2, relatively to the arm $d^1$ so that when the bell $f$ again rises with the fresh supply of gas, the block prevents the valve opening should it for any reason tend to open accidentally. Simultaneously with the depression of the piston of the pump $i$, the bell $f$, through the medium of a link $n$, stud $n^1$, and spindle $n^2$, is simultaneously depressed and momentarily presses down the plungers $j$, $k$, and levers $d$, $j^1$ and allows the arm $d^1$ to move to the other side of the block $j^3$ on the lever $j^1$, whereupon, and, with the rise of the bell, the valve is made free to rise its full height and fully open the gas outlet passage $b$.

On the supply of gas again failing, the bell $f$ falls and closes the valve, and at the same time moves the arm $d^1$ of the valve lever to the opposite side of the block $j$ on lever $j^1$ until the gas supply is again renewed, when the operations of simultaneously operating the pump $i$ and momentarily depressing the bell and levers, and freeing the valve, are repeated, and so on continuously. When the locking devices are not used, the bell $f$ may act directly upon the valve $c$ or lever $d$ at the valve end, see Fig. 1a in which case the pivot of the lever $d$ will require to be lowered, and the bell to be made shallower.

The spindle $n^2$ is a sliding fit where it passes through the top of the casing $h$, and it preferably operates upon the bell through the medium of a lead washer $f^1$ and pin $f^2$, the pin telescopically fitting a hole in the spindle. The washer and spindle also act as weights to lower the bell when the gas fails to hold it raised.

The cross-bar or frame $l$ carries the pivot of the lever $d$, and is adjustable vertically on its supporting pillar $m$, see Fig. 4.

Referring now to Figs. 5 to 9, the placing of the valve $c^1$ in equilibrium, after being closed and held to its seating by the pressure of the new supply of gas, is effected by means of a bye-pass $c^2$. Such bye-pass may normally be held closed by a small springpressed valve $c^3$ below which may lie the spur $r^*$ of a lever $r$. In this construction of the improved apparatus a flexible diaphragm $s$ is preferably employed, and the diaphragm is housed in the casing $s^1$, which communicates with the chamber $s^2$ through a port or passage $s^3$. Connected centrally to the diaphragm is a spindle $s^4$ which at its top end passes through the cover of the casing $s^1$, its lower end lying within the chamber $s^2$. Engaging the flanges of a collar $s^5$ on the lower end of the spindle $s^4$ is the forked end of the lever $r$, whereby, with any vertical movement of the spindle, the lever is rocked about its axis. In one with such lever is an upwardly extending curved arm $r^1$, and also a protuberance $r^2$ and upon the valve lever $d^2$ is the downwardly extending arm $d^3$.

When the valve is closed and there is no gas holding up the diaphragm, the arm $r^1$, under the weight of the spindle $s^4$ and diaphragm $s$, bears against the arm $d^3$ of the valve lever and prevents accidental movement of the valve. When the new supply of gas enters the chamber $s^2$ and raised the diaphragm $s$, the protuberance $r^2$ moves to a position below the free end of the arm $d^3$ and the valve $c^1$ is again held against accidental opening, but immediately the spindle $s^4$ is given a downward movement by hand (after first closing the final outlet or outlets) and the lever $r$ is rocked about its axis to open the bye-pass $c^2$, the valve $c^1$ is made free to rise and open the outlet passage $b$ under the influence of its balance weight $d^4$, the effect of opening the bye-pass, with the final outlet or outlets shut, being to place the valve $c^1$ in equilibrium.

The bye-pass, which is of small diameter, may be without the valve $c^3$, since the amount of leakage will be very small and harmless, and will be useful in drawing attention to the fact, if the final outlet or outlets is or are open. When the bye-pass is without the valve the closing of the final outlet or outlets and a momentary depression of the spindle $s^4$ is all that will be necessary to bring about the re-opening of the valve $c^1$.

The bye-pass $c^3$, in the example shown, is produced by coring out a passage in the side wall of the outlet passage $b$, and to regulate the size of the outlet of the bye-pass, a small regulating screw $c^4$ is provided. Should there be any slight leakage in the outlet piping, the bye-pass outlet may be opened to compensate for such leakage when requiring to open the valve $c^1$.

In the top of the diaphragm casing $s^1$ is a vent $s^6$ to allow for the ingress and egress of air above the diaphragm. One side of the casing $s^2$ may be closed by glass, in order that the functions of the parts may be observed. Obviously the pump $i$ (Fig. 1) may be used in place of the bye-pass $c^2$ (Fig. 5).

By holding the valve locked against accidental disturbance when closed, and making it necessary to release the valve by hand before the valve is re-opened, the possibility of accidental reopening of the valve before the outlets are closed is reduced to a minimum. Further, by reason of the diaphragm (or bell) being on the inlet side and normally clear of the valve and also by reason of the valve being free to have a tendency to open (as distinct from a tendency to close), the valve is normally unaffected by fluctuations in the pressure or volume of the gas.

To facilitate operation of the spindle $s^4$, or air pump $i$, from a distance, a Bowden wire, pneumatic or other suitable means may be provided.

Figs. 5 to 9 represent more or less the most convenient and compact form in which to apply the invention, moreover, such form lends itself to cheapness of production.

The apparatus is capable of wide application. It may be usefully applied to gas systems without coin-controlled meters, and particularly in works, offices, factories, and institutions, etc., where it is the custom to turn off the gas at the main at night time, or at the week end. And, as aforesaid, the apparatus is also advantageous in connection with the repairing of mains, in that the users of the gas need not be previously warned to close all the burner taps.

Although primarily intended for use with gas-lighting and gas-heating appliances, the invention may be used with any other appliances, the flow of gas to which, or from which, requires to be automatically controlled in like manner to that of the gas flowing to (or requiring to flow) to gas-lighting and gas-heating appliances. Examples of such other uses may be the flow of gases in chemical and manufacturing processes, and especially where say the turning off of the main supply requires that a series of outlets shall be closed prior to again turning on the main supply.

What is claimed is:—

1. In automatic gas-controlling apparatus for a gas supply system comprising a valve and gas pressure responsive means for closing the same, an over-balanced valve having a normal tendency to open but adapted to be held closed by a small preponderance of gas pressure above it, and means for admitting fluid slowly below the valve to create a balancing fluid pressure thereunder when no outlet of the gas supply system is open, as set forth.

2. In automatic gas-controlling apparatus, a gas conduit, and a chamber in the length of said conduit, through which the gas normally flows, a valve within said chamber for controlling the flow of gas through said chamber, means for normally holding the valve in the open position, and a floatable member on the inlet side of the chamber adjacent said valve, which is normally held raised and clear of the valve by the pressure of the gas on the inlet side of the chamber, but which, with a decrease in the pressure of the gas, falls and closes the valve, said valve only reopening when the renewed gas supply has raised the floatable member and when the pressures on the upper and lower sides of the valves are equalized, and hand-operated means for controlling the admission of a fluid to the outlet side of the valve, whereby, with all the final outlets of the conduit closed, the pressures above and below the valve are equalized and the valve allowed to open, as set forth.

3. In automatic gas-controlling apparatus as claimed in claim 2, a valve for controlling the passage of the gas through the chamber, a lever with weighted arm to hold the valve normally open, a floatable member to close the valve when the gas supply fails, a lever between the floatable member and the valve lever, which, with the floatable member lowered and the valve closed, engages the valve lever to lock the same against reopening until the floatable member is again raised by a renewal of the gas supply, as set forth.

4. In automatic gas-controlling apparatus, a gas conduit, and a chamber in the length of said conduit with inlet and outlet passages, a valve within the chamber and at the junction of said passages for controlling the flow of the gas through said chamber, the valve being carried by a lever with a counterbalance weight on one arm to hold the valve normally open, a diaphragm within the upper part of said chamber, a spindle extending centrally downwards from said diaphragm, the diaphragm and spindle being normally held raised by the pressure of the gas on the inlet side of the said chamber, a further pivoted lever within the chamber which at one part engages the main valve lever and with which the lower end of the diaphragm spindle engages and, the wall of said chamber between the inlet and outlet passages having a bye-pass, a valve at the entrance of the bye-pass which the said further lever may open or close, said lever operating to allow the bye-pass valve to close when the main valve is open and operating to open the bye-pass valve when the main valve is closed, the main valve being closed by the diaphragm and its spindle when they fall, and being reopened when all the final outlets of the conduit are closed and when the pressures above and below it are equal, the diaphragm being previously raised by the renewed gas supply, as set forth.

5. Automatic gas-controlling apparatus as claimed in claim 4, wherein the main valve lever has a spur-like arm and the further lever, intermediate of the diaphragm spindle and main valve lever, has also a spur-like arm, the former for closing the main valve when the diaphragm is lowered, and the latter for holding the main valve closed when the diaphragm is raised by the renewed gas pressure, and thereby rendering it necessary to momentarily depress the diaphragm to permit of the reopening of the valve, as set forth.

In witness whereof I have signed my name to this specification.

HARRY AARONSON,
*Executor of Sam Mendel, Deceased.*